US008858812B2

(12) United States Patent
Furusawa et al.

(10) Patent No.: US 8,858,812 B2
(45) Date of Patent: Oct. 14, 2014

(54) PROCESSING METHOD FOR AN INK JET HEAD SUBSTRATE

(71) Applicant: Canon Kabushiki Kaisha, Tokyo (JP)

(72) Inventors: Kenta Furusawa, Yokohama (JP); Keiji Matsumoto, Yokohama (JP); Keisuke Kishimoto, Yokohama (JP); Kazuhiro Asai, Kawasaki (JP); Shuji Koyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/707,904

(22) Filed: Dec. 7, 2012

(65) Prior Publication Data

US 2013/0161286 A1 Jun. 27, 2013

(30) Foreign Application Priority Data

Dec. 26, 2011 (JP) ................................ 2011-283357

(51) Int. Cl.
*G01D 15/00* (2006.01)
*B41J 2/16* (2006.01)
*B44C 1/22* (2006.01)

(52) U.S. Cl.
CPC ............... *B44C 1/227* (2013.01); *B41J 2/1629* (2013.01); *B41J 2/1634* (2013.01); *B41J 2/1639* (2013.01); *B41J 2/1603* (2013.01); *B41J 2/1643* (2013.01)
USPC ................ 216/27; 216/37; 216/67; 29/890.1; 347/20; 347/40

(58) Field of Classification Search
USPC ............. 216/27, 37, 67; 29/890.1; 347/20, 40
See application file for complete search history.

(56) References Cited

U.S. PATENT DOCUMENTS

| | | | | |
|---|---|---|---|---|
| 6,045,214 | A | 4/2000 | Murthy et al. | |
| 7,950,150 | B2 * | 5/2011 | Yoo et al. | 29/890.1 |
| 8,429,820 | B2 * | 4/2013 | Koyama et al. | 29/890.1 |
| 2003/0107618 | A1 | 6/2003 | Conta et al. | |
| 2005/0155949 | A1 | 7/2005 | Park et al. | |
| 2007/0070122 | A1 | 3/2007 | Bertelsen et al. | |
| 2010/0050436 | A1 | 3/2010 | Yoo et al. | |

FOREIGN PATENT DOCUMENTS

| | | | |
|---|---|---|---|
| CN | 1197732 | A | 11/1998 |
| JP | 5-330046 | A | 12/1993 |
| JP | 2008-119955 | A | 5/2008 |

OTHER PUBLICATIONS

Office Action in Chinese Application No. 201210576369.8 (dated Jul. 25, 2014).

* cited by examiner

*Primary Examiner* — Duy Deo
*Assistant Examiner* — Maki Angadi
(74) *Attorney, Agent, or Firm* — Fitzpatrick, Cella, Harper & Scinto

(57) ABSTRACT

Provided is a processing method for an ink jet head substrate, including: forming a barrier layer on a substrate and forming a seed layer on the barrier layer; forming a resist film on the seed layer and patterning the resist film so that the patterned resist film corresponds to a pad portion for electrically connecting an ink jet head to an outside of the ink jet head; forming the pad portion in an opening of the patterned resist film; removing the resist film; subjecting the substrate to anisotropic etching to form an ink supply port; removing the barrier layer and the seed layer; and performing laser processing from a surface of the substrate.

14 Claims, 5 Drawing Sheets

PROCESSING METHOD FOR AN INK JET HEAD SUBSTRATE

BACKGROUND OF THE INVENTION

1. Field of the Invention

The present invention relates to a processing method for an ink jet head substrate.

2. Description of the Related Art

There is a method of forming a through hole for supplying ink with a laser on a silicon substrate on which a semiconductor element and the like are formed. However, there is a case in which debris generated during laser processing adheres to the semiconductor element to influence the ejection performance and mounting process. Japanese Patent Application Laid-Open No. H05-330046 discloses a method of forming a protective film made of a resin in advance on a silicon substrate surface on which a semiconductor element and the like are formed, receiving the debris generated during laser processing with the protective film, and removing the protective film, to thereby prevent the debris from adhering to the semiconductor element.

SUMMARY OF THE INVENTION

According to an exemplary embodiment of the present invention, there is provided a processing method for an ink jet head substrate, including, in the following order:

(a1) forming a barrier layer on a substrate and forming a seed layer on the barrier layer;

(b1) forming a resist film on the seed layer and patterning the resist film so that the patterned resist film corresponds to a pad portion for electrically connecting an ink jet head to an outside of the ink jet head;

(c1) forming the pad portion in an opening of the patterned resist film;

(d1) removing the resist film;

(e1) performing laser processing from a surface of the substrate;

(f1) subjecting the substrate to anisotropic etching to form an ink supply port; and (g1) removing the barrier layer and the seed layer.

Further, according to an exemplary embodiment of the present invention, there is provided a processing method for an ink jet head substrate, including, in the following order:

(a2) forming a barrier layer on a substrate and forming a seed layer on the barrier layer;

(b2) performing laser processing from a surface of the substrate;

(c2) forming a resist film on the seed layer and patterning the resist film so that the patterned resist film corresponds to a pad portion for electrically connecting an ink jet head to an outside of the ink jet head;

(d2) forming the pad portion in an opening of the patterned resist film;

(e2) removing the resist film;

(f2) subjecting the substrate to anisotropic etching to form an ink supply port; and (g2) removing the barrier layer and the seed layer.

Further features of the present invention will become apparent from the following description of exemplary embodiments with reference to the attached drawings.

DESCRIPTION OF THE EMBODIMENTS

The method disclosed by Japanese Patent Application Laid-Open No. H05-330046 requires a step of applying a resin as a protective film before laser processing, and a step of removing the resin applied as the protective film after the laser processing. According to this method, the number of steps for laser processing is large, and it is difficult to simplify the laser processing step. The present invention has been made to solve the above-mentioned problem, and it is an object of the present invention to provide a processing method for an ink jet head substrate which can omit a step of forming a protective film for protecting a substrate surface from debris generated during laser processing and a step of removing the protective film.

Figure 5:
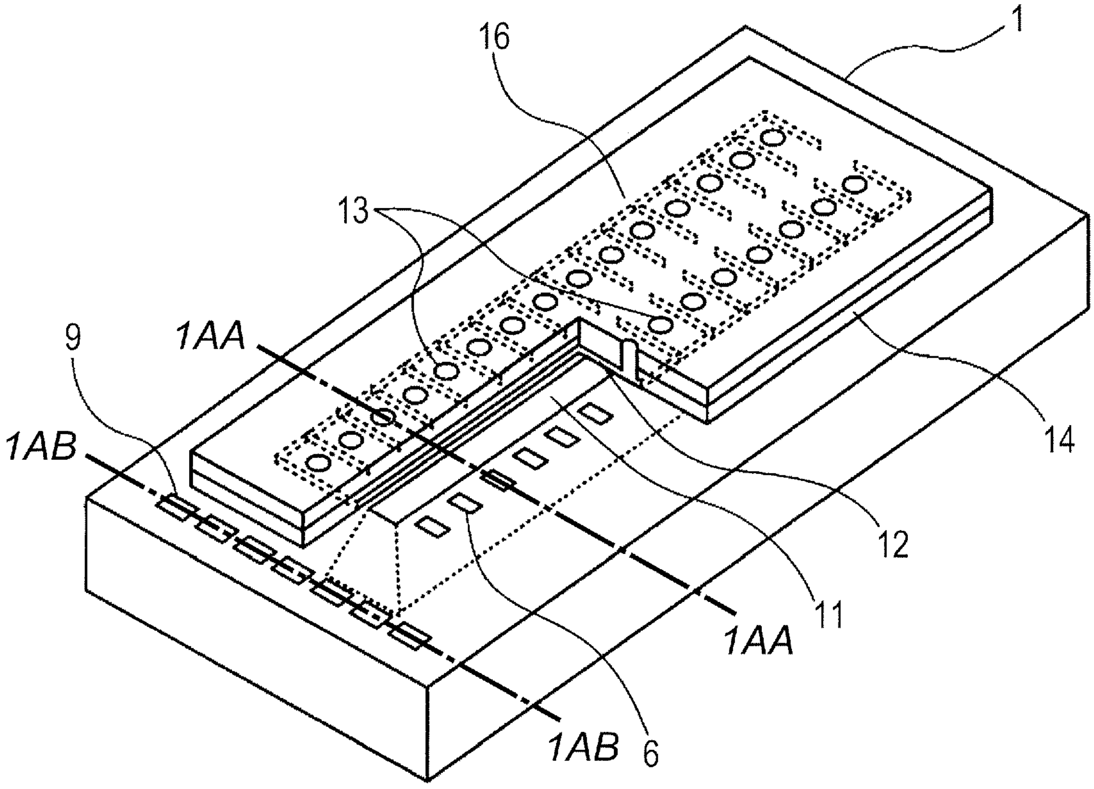
FIG. 5 is a perspective view illustrating an example of an ink jet head produced through use of a method according to the present invention.

FIG. 5 illustrates an example of an ink jet head produced through use of a method according to the present invention. In the ink jet head illustrated in FIG. 5, ink ejection energy generating elements 6 are arranged in two rows at predetermined pitches on a substrate 1 made of silicon. Above the substrate 1, a flow path 12 and ink ejection orifices 13 which are opened above the ink ejection energy generating elements 6 are respectively formed of a flow path forming member 14 and an ink ejection orifice forming member 16 made of a resin. In the present invention, the flow path forming member 14 and the ink ejection orifice forming member 16 forming the flow path 12 and the ink ejection orifices 13, respectively, are used as a nozzle. On the substrate 1, a pad portion 9 for electrically connecting the ink jet head to an outside of the ink jet head (ink jet recording apparatus) is formed. Further, an ink supply port 11 is formed between the two rows of the ink ejection energy generating elements 6. The ink supply port 11 communicates with each ink ejection orifice 13 through the flow path 12. The ink jet head is configured to apply a pressure generated by the ink ejection energy generating elements 6 to the ink filling the flow path 12 through the ink supply port 11 to eject ink droplets from the ink ejection orifices 13 and allow the ink droplets to adhere to a recording medium, thereby performing recording.

(First Embodiment)

A processing method for an ink jet head substrate according to a first embodiment of the present invention includes the following steps (a1) to (g1) in the following order:

(a1) forming a barrier layer on a substrate and forming a seed layer on the barrier layer;

(b1) forming a resist film on the seed layer and patterning the resist film so that the patterned resist film corresponds to a pad portion for electrically connecting an ink jet head to an outside of the ink jet head;

(c1) forming the pad portion in an opening of the patterned resist film;

(d1) removing the resist film;

(e1) performing laser processing from a surface of the substrate;

(f1) subjecting the substrate to anisotropic etching to form an ink supply port; and (g1) removing the barrier layer and the seed layer.

Figure 1A:
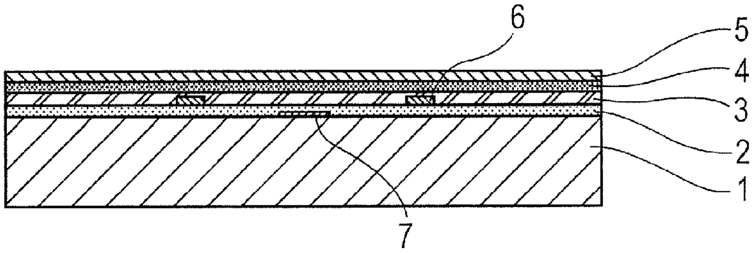
FIGS. 1AA, 1AB, 1BA, 1BB, 1CA, 1CB, 1DA, and 1DB are cross-sectional views illustrating a processing method for an ink jet head substrate according to a first embodiment of the present invention.
Figure 1A:
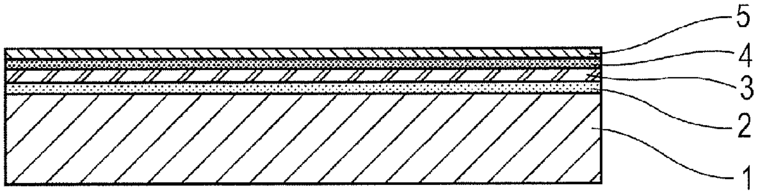

The processing method for an ink jet head substrate according to the first embodiment of the present invention is described with reference to FIGS. 1AA to 3DC. FIG. 1AA illustrates a cross-section taken along the line 1AA-1AA of FIG. 5, and FIG. 1AB illustrates a cross-section taken along the line 1AB-1AB of FIG. 5. This similarly applies to FIGS. 1BA to 1DB, FIGS. 2AA to 2BC, and FIGS. 3CA to 3DC. FIG. 2AC illustrates a top view of FIG. 2AA. This similarly applies to FIGS. 2BC, 3CC, and 3DC.

On the substrate 1 illustrated in FIGS. 1AA and 1AB, a sacrificial layer 7, an interlayer insulating layer 2, and multiple ink ejection energy generating elements (heaters) 6 such as heat generating resistive elements are provided. As the substrate 1, a silicon substrate can be used. Regarding the heaters 6, for example, TaSiN can be used for the heat generating resistive elements. The sacrificial layer 7 can contain, for example, aluminum, an aluminum compound, a compound of aluminum and silicon, or an aluminum-copper alloy. The sacrificial layer 7 may contain only one kind thereof or two or more kinds thereof. For the interlayer insulating layer 2, SiO, SiN, or the like can be used. Wiring connected to the heaters 6 and semiconductor elements for driving the heaters 6 are not shown. The heaters 6, the sacrificial layer 7, and other elements and wiring are covered with an insulating protective layer 3. For the insulating protective layer 3, SiO, SiN, or the like can be used. A barrier layer 4 is formed on the insulating protective layer 3. The barrier layer 4 not only prevents a seed layer 5 described later from diffusing to the insulating protective layer 3 but also enhances adhesiveness of the seed layer 5. It is preferred that the barrier layer 4 contain at least one kind selected from the group consisting of Ti, W, a compound containing Ti and W, and TiN. The thickness of the barrier layer 4 is preferably 170 nm or more and 300 nm or less, and more preferably 180 nm or more and 250 nm or less. Next, the seed layer 5 for forming the pad portion 9 described later is formed on the barrier layer 4. The seed layer 5 also serves as a protective film against debris generated during laser processing described later. It is preferred that the seed layer 5 be made of a metal insoluble in an etchant used in anisotropic etching described later, because the seed layer 5 can also be used as an etching protective film. Specifically, it is preferred that the seed layer 5 contain at least one kind selected from the group consisting of Au, Ag, and Cu. The thickness of the seed layer 5 is preferably 10 nm or more and 500 nm or less, and more preferably 45 nm or more and 55 nm or less.

Figure 1B:
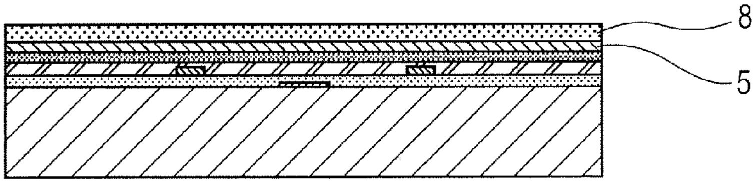
Figure 1B:
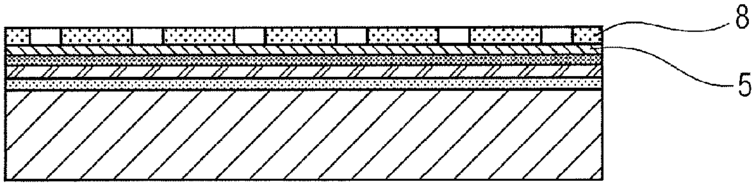
Figure 2A:
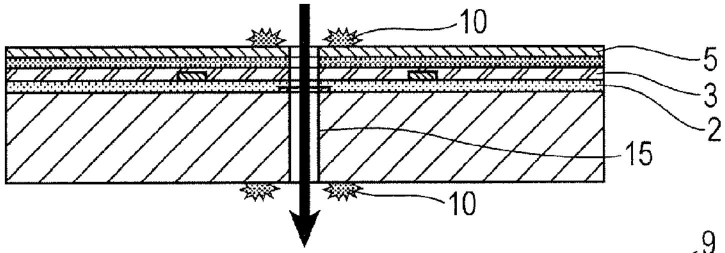
FIGS. 2AA, 2AB, 2AC, 2BA, 2BB, and 2BC are cross-sectional views and top views illustrating the processing method for an ink jet head substrate according to the first embodiment of the present invention.
Figure 2A:
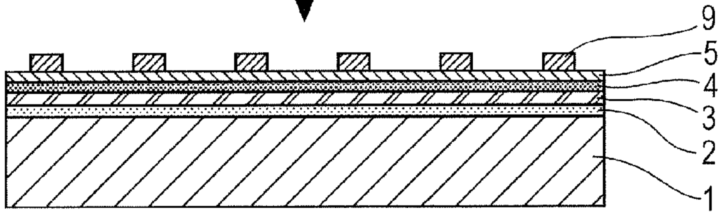
Figure 2A:
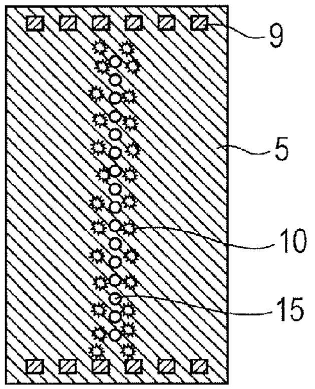

Next, as illustrated in FIGS. 1BA and 1BB, a resist film 8 is formed on the seed layer 5 by coating, and exposed to light and developed, to thereby form the patterned resist film 8. As a chemical solution used for forming the resist film 8, for example, commercially available PMER P-LA300PM (trade name, produced by TOKYO OHKA KOGYO CO., LTD.) and the like can be used. A method of applying the chemical solution is not particularly limited. The thickness of the resist film 8 is preferably 10 nm or more and 500 nm or less, and more preferably 45 nm or more and 55 nm or less. The resist film 8 may be formed by application of the resist film 8 or the like, instead of coating of the chemical solution. Through exposure and development with respect to the resist film 8, patterning corresponding to the pad portion 9 (described later) for electrically connecting the ink jet head to the outside of the ink jet head is performed. There is no particular limitation to the exposure method as long as the patterning can be performed accurately. As a chemical solution used for development, for example, commercially available NMD-3 (trade name, produced by TOKYO OHKA CO., LTD.) or the like can be used.

Figure 1C:
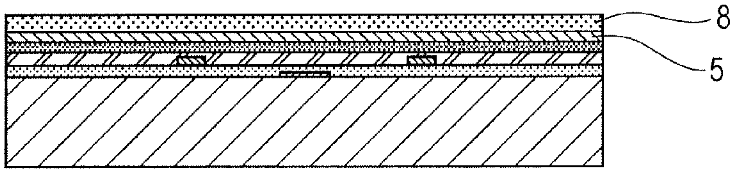
Figure 1C:
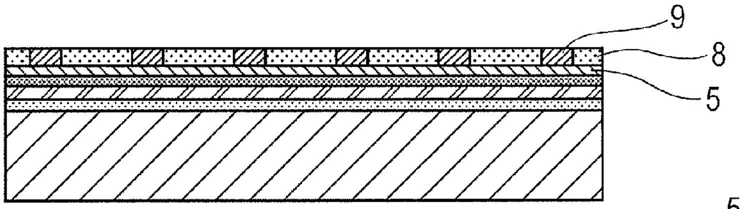

Next, as illustrated in FIGS. 1CA and 1CB, plating is performed with use of the patterned resist film 8 as a plating mask, and thus, the pad portion 9 is formed in the opening of the patterned resist film 8. As the material for the pad potions 9, Au, Ag, Cu, or the like can be used, and it is preferred to use the same material as that for the seed layer 5. Only one kind of these materials may be used, or two or more kinds thereof may be used. A plating method is not particularly limited as long as the opening of the patterned resist film 8 can be filled with a material for the pad portion 9 sufficiently to form the pad portion 9. Further, the pad portion 9 may be formed by a method other than plating, as long as the openings of the patterned resist film 8 can be filled with a material for the pad portion 9 sufficiently to form the pad portion 9.

Figure 1D:
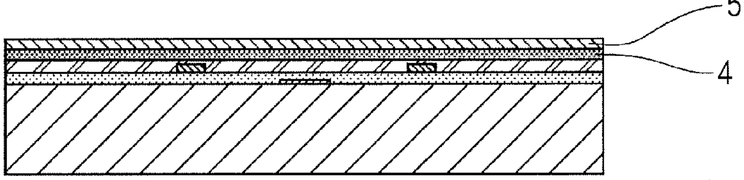
Figure 1D:
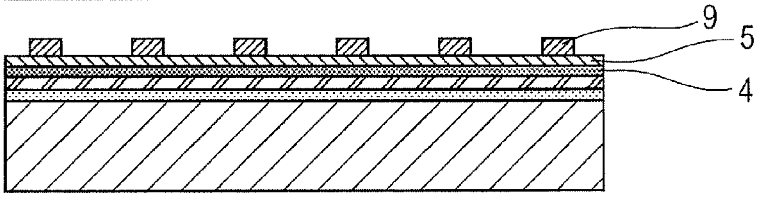

Next, as illustrated in FIGS. 1DA and 1DB, the patterned resist film 8 used as the plating mask is removed with a stripping solution. As the stripping solution, for example, commercially available MICROPOSIT Remover 1112A (trade name, produced by Rohm and Haas Electronic Materials Company) or the like can be used, depending upon the material for the resist film 8.

Next, as illustrated in FIGS. 2AA to 2AC, a portion corresponding to the sacrificial layer 7 is processed with a laser from the surface of the substrate 1, on which the pad portion 9 is formed. Thus, a laser through hole 15 is formed. The laser processing depth is not particularly limited as long as the seed layer 5, the barrier layer 4, the insulating protective layer 3, the interlayer insulating layer 2, and the substrate 1 can be processed simultaneously. Although the laser through hole may or may not pass through the substrate 1, it is preferred that the laser through hole 15 pass through the substrate 1. The laser spot diameter can be set so that a laser falls within a frame of the sacrificial layer 7, and for example, preferably 10 μm or more and 200 μm or less, and more preferably 20 μm or more and 30 μm or less. The laser processing pattern may be a linear pattern formed by continuous processing or a pattern of a combination of dots as long as the pattern is within the frame of the sacrificial layer 7. There is no particular limitation to the laser processing pattern as long as the pattern allows the ink supply port 11 to be opened by the subsequent anisotropic etching. Further, the laser type is not particularly limited as long as the laser can process the seed layer 5, the barrier layer 4, the insulating protective layer 3, the interlayer insulating layer 2, and the substrate 1. As the laser type, for example, a YAG laser or the like can be used. Debris 10 generated by melting during laser processing adheres to a periphery of the laser through hole 15 (both surfaces of the substrate 1). In the present invention, before the step of performing laser processing, the step of forming a protective film for protecting the surface of the substrate 1 against the debris 10 generated by the laser processing can be omitted.

Figure 2B:
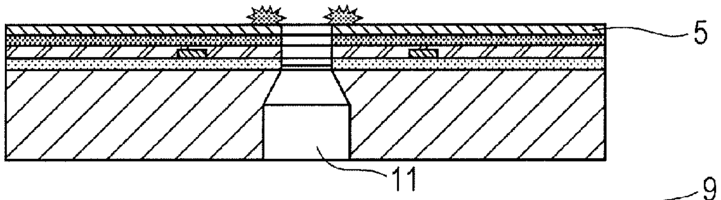
Figure 2B:
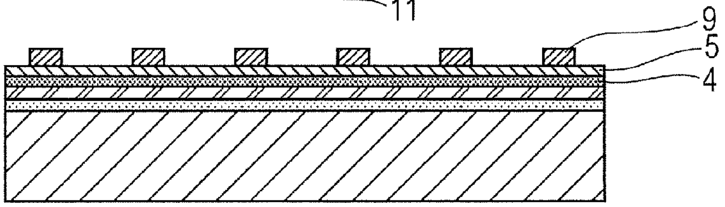
Figure 2B:
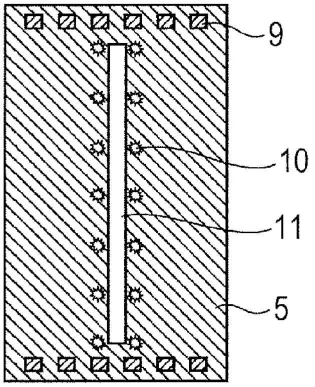

Next, as illustrated in FIGS. 2BA to 2BC, the ink supply port 11 is formed in the substrate 1 by anisotropic etching. As an etchant, for example, a liquid containing tetramethylammonium hydroxide (TMAH), water, and silicon if desired can be used. It is preferred that the concentration of the TMAH be 8 to 25% by mass with respect to the water solvent. It is preferred that the content of silicon be 0 to 8% by mass with respect to the TMAH aqueous solution. It is preferred that the temperature of the etchant for anisotropic etching be 80° C. or higher and 90° C. or lower. As the etchant, other liquids may be used instead of the above-mentioned etchant, as long as the liquid does not dissolve the seed layer 5 and the pad portion 9. Further, etching may be performed after a protective film for an etchant is formed on the seed layer 5 and the pad portion 9. As the protective film for an etchant, for example, OBC (trade name, produced by TOKYO OHKA KOGYO CO., LTD.) can be used. However, from the viewpoint of simplifying the process, it is preferred to use the seed layer 5 as the protective film for an etchant without providing the protective film for an etchant separately. The front surface of the substrate 1 is not etched because the front surface is covered with the seed layer 5 and the pad portion 9 insoluble in an etchant or with the protective film. On the other hand, the rear surface of the substrate 1 is not covered with a film withstanding an etchant, and hence, etching proceeds from the rear surface of the substrate 1 toward the front surface of the substrate 1. Simultaneously with this, the debris 10 adhering to the rear surface of the substrate 1, which has been generated during laser processing, is lifted off, and hence, the debris 10 does not remain on the rear surface of the substrate 1 after etching. In the case where the protective film for an etchant is formed, the protective film is removed after etching.

Figure 3C:
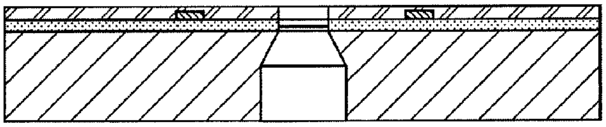
FIGS. 3CA, 3CB, 3CC, 3DA, 3DB, and 3DC are cross-sectional views and top views illustrating the processing method for an ink jet head substrate according to the first embodiment of the present invention.
Figure 3C:
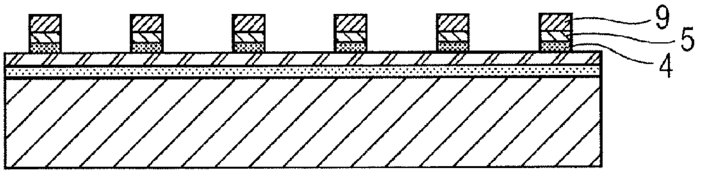
Figure 3C:
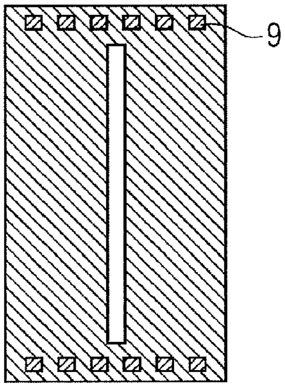

Next, as illustrated in FIGS. 3CA to 3CC, the barrier layer 4 and the seed layer 5 are removed. As a chemical solution used for removing the seed layer 5, a chemical solution containing iodine, potassium iodide, and the like can be used, depending upon the kind of the seed layer 5. As a chemical solution used for removing the barrier layer 4, a chemical solution containing a hydrogen peroxide solution or the like can be used, depending upon the kind of the barrier layer 4. Due to this process, the debris 10 adhering to the front surface of the substrate 1, which has been generated during laser processing, is also lifted off.

Figure 3D:
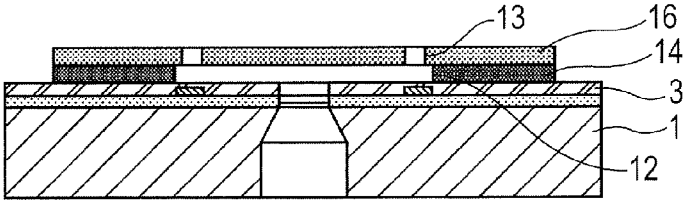
Figure 3D:
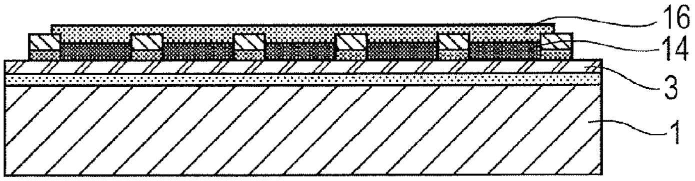
Figure 3D:
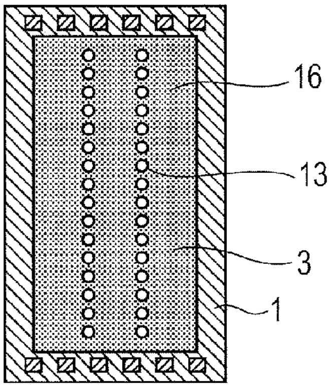

Next, as illustrated in FIGS. 3DA to 3DC, in order to form the flow path 12, the flow path forming member 14 is formed on the insulating protective layer 3. There is no particular limitation to a method of forming the flow path forming member 14, and for example, the flow path forming member 14 can be formed by applying a photosensitive dry film. In the flow path forming member 14, a region to be a flow path wall of the flow path 12 is exposed to light. After that, in order to form the ink ejection orifices 13, the ink ejection orifice forming member 16 is formed on the flow path forming member 14. There is no particular limitation to a method of forming the ink ejection orifice forming member 16, and for example, the ink ejection orifice forming member 16 can be formed by application of a photosensitive dry film or coating of a photosensitive resin. A water-repellent material may be applied to the surface of the ink ejection orifice forming member 16. A region other than portions corresponding to the ink ejection orifices 13 is exposed to light in the ink ejection orifice forming member 16. After that, unexposed portions of the flow path forming member 14 and the ink ejection orifice forming member 16 are developed, and thus, the flow path 12 and the ink ejection orifices 13 are formed. The ink jet head illustrated in FIG. 5 is completed by the above-mentioned process.

As described above, according to the method of this embodiment, the seed layer 5 used for forming the pad portion 9 can be used directly as the protective film against the debris 10 generated during laser processing. Therefore, the step of forming a protective film for protecting the surface of the substrate 1 against the debris 10 generated during laser processing and the step of removing the protective film can be omitted. Further, in the case of using a metal insoluble in an etchant used for anisotropic etching as a material for the seed layer 5, the seed layer 5 can also be used as a protective film for anisotropic etching.

Second Embodiment

A processing method for an ink jet head substrate according to a second embodiment of the present invention includes the following steps (a2) to (g2) in the following order:

(a2) forming a barrier layer on a substrate and forming a seed layer on the barrier layer;

(b2) performing laser processing from a surface of the substrate;

(c2) forming a resist film on the seed layer and patterning the resist film so that the patterned resist film corresponds to a pad portion for electrically connecting an ink jet head to an outside of the ink jet head;

(d2) forming the pad portion in an opening of the patterned resist film;

(e2) removing the resist film;

(f2) subjecting the substrate to anisotropic etching to form an ink supply port; and (g2) removing the barrier layer and the seed layer.

This embodiment is different from the first embodiment in that the step of performing laser processing is performed immediately after the step of forming the barrier layer 4 and the seed layer 5.

The processing method for an ink jet head substrate according to the second embodiment of the present invention is described with reference to FIGS. 4AA to 4DB. The steps other than those illustrated in FIGS. 4AA to 4DB are the same as those of the first embodiment, and hence, the description thereof is omitted. In this embodiment, before the step illustrated in FIGS. 4AA to 4AC, the step illustrated in FIGS. 1AA and 1AB is performed, and after the step illustrated in FIGS. 4DA and 4DB, the steps illustrated in FIGS. 2BA to 2BC and thereafter are performed.

Figure 4A:
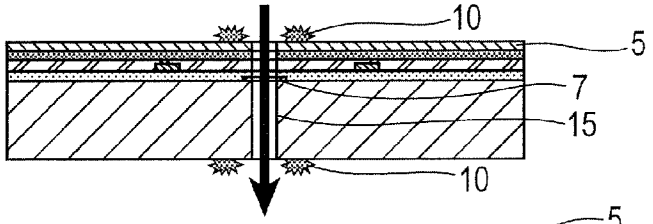
FIGS. 4AA, 4AB, 4AC, 4BA, 4BB, 4CA, 4CB, 4DA, and 4DB are cross-sectional views and a top view illustrating a processing method for an ink jet head substrate according to a second embodiment of the present invention.
Figure 4A:
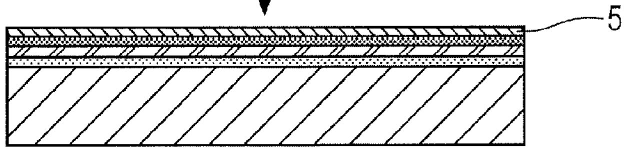
Figure 4A:
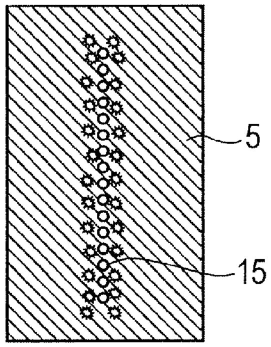

As illustrated in FIGS. 4AA to 4AC, a portion corresponding to the sacrificial layer 7 is processed with a laser from the surface of the substrate 1, on which the seed layer 5 is formed. The laser processing depth, laser spot diameter, laser processing pattern, and laser type can be set to be the same as those of the first embodiment.

Figure 4B:
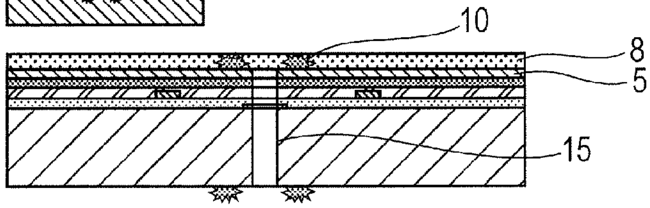
Figure 4B:
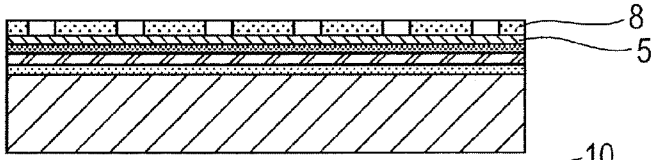

Next, as illustrated in FIGS. 4BA and 4BB, the resist film 8 is formed on the seed layer 5 in which the laser through hole 15 is formed, and is exposed to light and developed, to thereby form the patterned resist film 8. The resist film 8 can be formed by application of the resist film 8. The material for the resist film 8, thickness thereof, and chemical solution used for exposure and development can be set to be the same as those of the first embodiment.

Figure 4C:
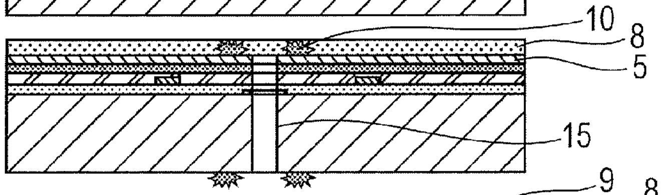
Figure 4C:
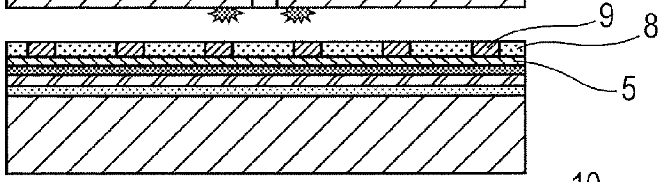

Next, as illustrated in FIGS. 4CA and 4CB, plating is performed using the patterned resist film 8 as a plating mask, and thus, the pad portion 9 is formed in the opening of the patterned resist film 8. The material for the pad portion 9 and a method of forming the pad portion 9 can be set to be the same as those of the first embodiment.

Figure 4D:
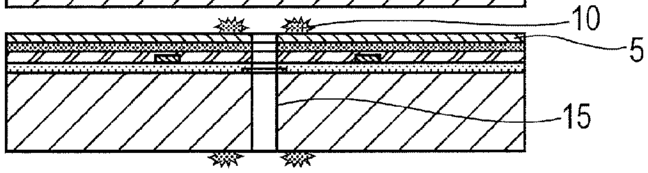
Figure 4D:
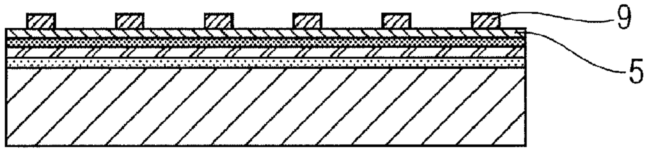

Next, as illustrated in FIGS. 4DA and 4DB, the resist film 8 used as the plating mask is removed with a stripping solution. The stripping solution can be the same as that of the first embodiment.

EXAMPLES

The present invention is hereinafter described by way of examples. Note that, the present invention is not limited to these examples.

Example 1

A processing method for an ink jet head substrate according to this example is described with reference to FIGS. 1AA to 3DC.

On a substrate 1 illustrated in FIGS. 1AA and 1AB, a sacrificial layer 7, an interlayer insulating layer 2, and multiple ink ejection energy generating elements (heaters) 6 that are heat generating resistive elements are arranged. As the substrate 1, a silicon substrate was used. As the heaters 6, heat generating resistive elements made of TaSiN were used. Aluminum was used for the sacrificial layer 7. Wiring connected to the heaters 6 and semiconductor elements for driving the heaters 6 are not shown. The heaters 6, the sacrificial layer 7, and other elements and wiring were covered with an insulating protective layer 3. A barrier layer 4 was formed on the insulating protective layer 3. As a material for the barrier layer 4, TiW was used. The thickness of the barrier layer 4 was 200 nm. Next, a seed layer 5 for forming pad portion 9 described later was formed on the barrier layer 4. As a material for the seed layer 5, Au was used. The thickness of the seed layer 5 was 50 nm.

Next, as illustrated in FIGS. 1BA and 1BB, a resist film 8 was formed on the seed layer 5 by coating, and patterned by exposure and development, to thereby form a plating mask. For formation of the resist film 8, a chemical solution containing, as a main component, PMER P-LA300PM (trade name, produced by TOKYO OHKA KOGYO CO., LTD.) was used. For development, NMD-3 (trade name, produced by TOKYO OHKA KOGYO CO., LTD.) was used.

Next, as illustrated in FIGS. 1CA and 1CB, plating was performed through use of the patterned resist film 8 as the plating mask, to thereby form the pad portion 9. As a material for the pad portion 9, Au was used similarly to the seed layer 5.

Next, as illustrated in FIGS. 1DA and 1DB, the plating mask formed of the patterned resist film 8 was removed with a removal solution. As the removal solution, MICROPOSIT Remover 1112A (trade name, produced by Rohm and Haas Electronic Materials Company) was used.

Next, as illustrated in FIGS. 2AA to 2AC, a portion corresponding to the sacrificial layer 7 was processed with a laser from the surface of the substrate 1, on which the pad portion 9 was formed. The laser processing was performed so that the processing depth reached a surface of the substrate 1 on an opposite side. Thus, a laser through hole 15 was formed. The laser spot diameter was adjusted to 30 μm. The laser processing was performed in a pattern in which dots were arranged linearly in a frame of the sacrificial layer 7. Further, as a laser type, a YAG laser was used.

Next, as illustrated in FIGS. 2BA to 2BC, an ink supply port 11 was formed in the substrate 1 by anisotropic etching. As an etchant, an aqueous solution containing 22% by mass of TMAH in a water solvent was used. The liquid temperature of the etchant during etching was 83° C.

Next, as illustrated in FIGS. 3CA to 3CC, the seed layer 5 and the barrier layer 4 were removed. For removal of the seed layer 5, a chemical solution containing, as main components, iodine and potassium iodide was used. Further, for removal of the barrier layer 4, a hydrogen peroxide solution was used.

Next, as illustrated in FIGS. 3DA to 3DC, in order to form a flow path 12, a flow path forming member 14 was formed by applying a photosensitive dry film to the insulating protective layer 3. A region corresponding to a flow path wall was exposed to light in the flow path forming member 14. Further, in order to form an ink ejection orifice 13, a photosensitive resin was applied to the flow path forming member 14 to form an ink ejection orifice forming member 16. A region other than portions corresponding to the ink ejection orifice 13 was exposed to light in the ink ejection orifice forming member 16. After that, development was performed to form the flow path 12 and the ink ejection orifice 13. Thus, an ink jet head was produced.

Example 2

A processing method for an ink jet head substrate according to this example is described with reference to FIGS. 4AA to 4DB. This example is different from Example 1 in that the step of forming the laser through hole 15 is performed immediately after the step of forming the seed layer 5.

As illustrated in FIGS. 1AA and 1AB, the insulating protective layer 3, the barrier layer 4, and the seed layer 5 were formed on the substrate 1 in the same way as in Example 1.

As illustrated in FIGS. 4AA to 4AC, a portion corresponding to the sacrificial layer 7 was processed with a laser from the surface of the substrate 1, on which the seed layer 5 was formed. The laser processing depth, laser spot diameter, laser processing pattern, and laser seed were the same as those of Example 1.

Next, as illustrated in FIGS. 4BA and 4BB, the resist film 8 was attached to the seed layer 5 in which the laser through hole 15 was formed, and was exposed to light and developed, to thereby form the patterned resist film 8 as a plating mask. For formation of the resist film 8, a dry film containing, as a main component, PMER P-LA300PM (trade name, produced by TOKYO OHKA KOGYO CO., LTD.) was used. For development, NMD-3 (trade name, produced by TOKYO OHKA KOGYO CO., LTD.) was used.

Next, as illustrated in FIGS. 4CA and 4CB, plating was performed through use of the patterned resist film 8 as the plating mask, to thereby form the pad portion 9. As a material for the pad portion, Au was used similarly to the seed layer 5.

Next, as illustrated in FIGS. 4DA and 4DB, the plating mask formed of the patterned resist film 8 was removed with a removal solution. As the removal solution, MICROPOSIT Remover 1112A (trade name, produced by Rohm and Haas Electronic Materials Company) was used.

The steps illustrated in FIGS. 2BA to 2BC and thereafter were performed in the same way as in Example 1 to produce an ink jet head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-283357, filed Dec. 26, 2011, which is hereby incorporated by reference herein in its entirety.

What is claimed is:

1. A processing method for an ink jet head substrate, comprising, in the following order:

(a1) forming a barrier layer on a substrate and forming a seed layer on the barrier layer;

(b1) forming a resist film on the seed layer and patterning the resist film so that the patterned resist film corresponds to a pad portion for electrically connecting an ink jet head to an outside of the ink jet head;

(c1) forming the pad portion in an opening of the patterned resist film;

(d1) removing the resist film;

(e1) performing laser processing from a surface of the substrate;

(f1) subjecting the substrate to anisotropic etching to form an ink supply port; and (g1) removing the barrier layer and the seed layer.

2. A processing method for an ink jet head substrate according to claim 1, wherein a step of forming a protective film for protecting the surface of the substrate against debris to be generated during the laser processing is not conducted before the step of performing laser processing.

3. A processing method for an ink jet head substrate according to claim 1, wherein the seed layer comprises at least one kind selected from the group consisting of Au, Ag, and Cu.

4. A processing method for an ink jet head substrate according to claim 1, wherein the seed layer has a thickness of 10 nm or more and 500 nm or less.

5. A processing method for an ink jet head substrate according to claim 1, wherein the barrier layer comprises at least one kind selected from the group consisting of Ti, W, a compound containing Ti and W, and TiN.

6. A processing method for an ink jet head substrate according to claim 1, wherein the barrier layer has a thickness of 170 nm or more and 300 nm or less.

7. A processing method for an ink jet head substrate according to claim 1, wherein the laser processing is processing to pass through the substrate.

8. A processing method for an ink jet head substrate, comprising, in the following order:

(a2) forming a barrier layer on a substrate and forming a seed layer on the barrier layer;

(b2) performing laser processing from a surface of the substrate;

(c2) forming a resist film on the seed layer and patterning the resist film so that the patterned resist film corresponds to a pad portion for electrically connecting an ink jet head to an outside of the ink jet head;

(d2) forming the pad portion in an opening of the patterned resist film;

(e2) removing the resist film;

(f2) subjecting the substrate to anisotropic etching to form an ink supply port; and (g2) removing the barrier layer and the seed layer.

9. A processing method for an ink jet head substrate according to claim 8, wherein a step of forming a protective film for protecting the surface of the substrate against debris to be generated during the laser processing is not conducted before the step of performing laser processing.

10. A processing method for an ink jet head substrate according to claim 8, wherein the seed layer comprises at least one kind selected from the group consisting of Au, Ag, and Cu.

11. A processing method for an ink jet head substrate according to claim 8, wherein the seed layer has a thickness of 10 nm or more and 500 nm or less.

12. A processing method for an ink jet head substrate according to claim 8, wherein the barrier layer comprises at least one kind selected from the group consisting of Ti, W, a compound containing Ti and W, and TiN.

13. A processing method for an ink jet head substrate according to claim 8, wherein the barrier layer has a thickness of 170 nm or more and 300 nm or less.

14. A processing method for an ink jet head substrate according to claim 8, wherein the laser processing is processing to pass through the substrate.

* * * * *